United States Patent [19]

Scherbel et al.

[11] Patent Number: 4,744,971
[45] Date of Patent: May 17, 1988

[54] PROCESS FOR TREATMENT OF PHOSSY WATER FOR RECYCLING

[75] Inventors: Gordon H. Scherbel; David A. Crea; Jerry A. Keely; Ronald L. Andersen, all of Pocatello, Id.; Byron L. Nichols, Federal Way, Wash.

[73] Assignee: FMC Corporation, Philadelphia, Pa.

[21] Appl. No.: 931,375

[22] Filed: Nov. 14, 1986

Related U.S. Application Data

[63] Continuation of Ser. No. 746,916, Jun. 20, 1985, abandoned, which is a continuation of Ser. No. 527,061, Aug. 29, 1983, abandoned.

[51] Int. Cl.$^4$ .............................................. C01B 25/01
[52] U.S. Cl. ............................... 423/323; 210/712; 210/787; 210/802; 210/805; 423/322
[58] Field of Search ................ 423/322, 323; 210/802, 210/803, 712, 787, 805, 806; 23/293 R, 293 S, 293 A

[56] References Cited

U.S. PATENT DOCUMENTS

| | | | |
|---|---|---|---|
| 2,050,796 | 8/1936 | Kerschbaum et al. | 423/322 |
| 2,267,496 | 12/1941 | Ellis et al. | 209/166 |
| 3,068,070 | 12/1962 | Felch | 423/322 |
| 3,428,430 | 2/1969 | Megar et al. | 423/322 |
| 3,436,184 | 4/1969 | Hinkebein | 423/322 |
| 3,441,130 | 4/1969 | Sisson et al. | 209/2 |
| 3,442,621 | 5/1969 | Hinkebein | 423/322 |
| 3,515,515 | 6/1970 | Hinkebein | 423/322 |
| 3,768,648 | 10/1973 | Anderson et al. | 210/802 X |
| 3,832,448 | 8/1974 | Longfield et al. | 423/322 |
| 3,862,033 | 1/1975 | Rozkydalek | 210/802 X |
| 4,014,682 | 3/1977 | Majewski | 423/323 X |

Primary Examiner—John F. Niebling
Assistant Examiner—Nam X. Nguyen
Attorney, Agent, or Firm—Frank Ianno; Eugene G. Seems

[57] ABSTRACT

In the electric arc furnace production of elemental phosphorus, cold phossy water is segregated from hot phossy water. The cold phossy water is discharged to a lined pond wherein solids settle to form a clarified cold water which is recycled for cooling and washing purposes. The hot phossy water is passed through a lamellar settler wherein phosphorus and solids are separated as a sludge to form a clarified hot water. The clarified hot water, without requiring additional heat, is recycled for process use. Phosphorus is recovered from the sludge to reduce to a minimum the amount of phosphorus discharged with dirt from the hot phossy water to the pond.

13 Claims, 1 Drawing Sheet

U.S. Patent May 17, 1988 4,744,971
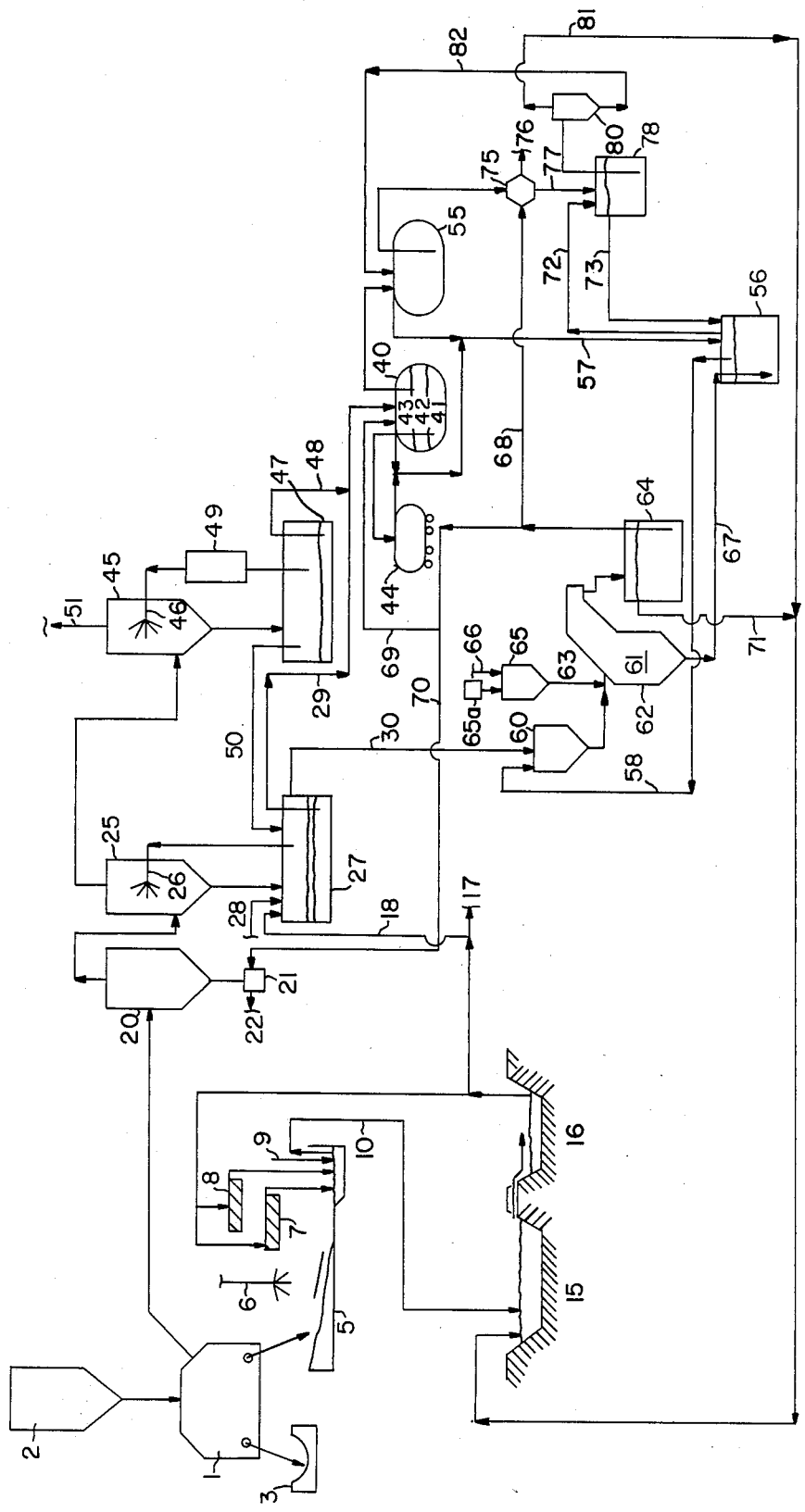

PROCESS FOR TREATMENT OF PHOSSY WATER FOR RECYCLING

This application is a continuation of application Ser. No. 746,916 now abandoned, filed June 20, 1985 which is a continuation of application Ser. No. 527,061 filed Aug. 29, 1983, now abandoned.

This invention relates to a process for the treatment of phossy water, that is, water contaminated with phosphorus and usually with dirt, which is produced during the manufacture and handling of elemental phosphorus.

In the thermal reduction of phosphate ore in an electric arc furnace, the furnace is supplied with a burden or feed consisting of a briquetted and calcined phosphate ore, a reducing agent, generally coke, and a flux such as silica. The electric arcs in the furnace produce temperatures sufficiently high so as to effect a reduction of the ore by the reducing agent thereby forming elemental phosphorus, carbon monoxide and traces of other gases. The phosphorus-containing gases leave the furnace at temperatures of from about 200° C. to about 400° C. and also contain finely-divided solids originating from the furnace burden or formed during the operation.

The residual reaction melt is tapped periodically from the furnace, drained to a pit and frozen by cooling with sprayed water. The slag is suitable, after crushing, for railroad ballast, road aggregate or asphalt. Excess cooling water will drain off and combine with other dirty waste waters such as furnace building floor wash water, rainstorm runoff and pad drainage from other areas which must be handled as phossy water, but are contaminated with mostly dirt and only minor amounts of phosphorus.

The hot gases from the furnace are passed to a suitable gas-solids separator, such as an electrostatic precipitator, wherein the major proportion of the finely-divided solids is removed. In order to prevent premature condensation of phosphorus vapors, the precipitator may be provided with means for supplying heat or for extracting heat so that the gases leaving the precipitator are at a temperature of about 300° C. The removed solids are mixed with hot water to ease handling and prevent spontaneous combustion and are then subjected to further processing. Since the precipitator dust generally contains a substantial proportion of $P_2O_5$, with zinc and potash, the dustwater mixture may be dried and used as a fertilizer. Alternatively, the dust-water mixture may be used in agglomerating or briquetting crushed phosphate ore for use as a portion of the furnace burden.

The hot phosphorus-containing gases then pass to the bottom of an adiabatic water spray condenser to reduce the gas temperature below the dew point of the phosphorus but above the freezing point of the phosphorus, typically about 60° C. The phosphorus vapor condenses into liquid globules which fall to the base of the condenser along with the water. The gas also contains some particulate solids not removed in the electrostatic precipitator but which become entrained with the phosphorus globules and water droplets. The phosphorus globules, particulate solids and water pass into a sump forming a suspension of phosphorus globules and solids in the water. The suspension is allowed to stratify into three layers; a lower layer of liquid phosphorus formed by a coalescence of the phosphorus globules, an upper layer of water and an intermediate layer. The water layer contains a minor amount of suspended finely-divided solids, a minor amount of finely-divided phosphorus globules and a minor amount of dissolved phosphorus. This water layer is recirculated constantly through the spray condenser. The intermediate layer, generally referred to as sludge, contains water, dissolved phosphorus, suspended finely-divided phosphorus globules, suspended particulate solids and often some trapped gases. Water in excess of the amount evaporated is added to the condenser system, and the excess leaves to provide a blowdown for suspended and dissolved solids.

The gases from the first spray condenser are passed to a second spray condenser using cold water which cools the gas further to about 20° C., below the phosphorus melting point of 44.1° C. Residual phosphorus is condensed, settled in a sump and forms a suspension of frozen phosphorus flakes in water. The phosphorus is melted periodically by heating and pumped out. The remaining gas leaving the second condenser is largely carbon monoxide and is used for heating purposes, especially drying and calcining the pelletized or briquetted ore, and drying the precipitator dust slurry. A portion of the water is recirculated back to the sprays after heat is removed in a cooling tower. The unit generates a clean form of phossy water from condensate which is preferably returned to the first condenser to balance evaporation there. A second form of phossy water is generated in the normal course of pad cleanup operations which contains mainly dirt and is not sent to the phosphorus recovery operations, but is preferably handled with other mostly dirt-contaminated waste waters.

The phosphorus and/or sludge layers in the sumps are transferred to suitable separation tanks where the sludge and phosphorus separate to different layers by their own accord, driven by density differences. The sludge and phosphorus layers which form under phossy water in the separation tanks are separated by displacement techniques commonly known to those who practice the art of phosphorus production. Pressurized water is used to move the contents of two or more separation tanks so that, with proper lines and valving, the lighter phossy water and sludge may be floated out of a tank to a sludge collector by filling a separation tank with phosphorus. Alternatively, the phosphorus layer is pushed from the bottom of one or more separation tanks to railroad cars or suitable holding tanks by using pressurized water and appropriate lines and valving.

Since phosphorus must be handled under water, all of the aforementioned separation tanks, sludge collectors, holding tanks, and railroad cars are filled with water at a temperature sufficiently high so as to maintain the phosphorus in a liquid state. The displacement water used must likewise be at a sufficiently high temperature. All of the water used will be in contact with some form of elemental phosphorus and will pick up dissolved phosphorus. The water displaced from tanks, as other materials are loaded, is suitable for reuse as displacement water or as makeup to the condensers because the presence of dissolved phosphorus is not objectionable so long as personnel are not exposed to the vapors. Reuse of this water is desirable because this water is already sufficiently heated and requires no further heating expense.

While there is little problem with using water containing dissolved phosphorus, suspended solids or phosphorus will cause mechanical problems with pumps or other equipment, increased hazard to personnel and general problems with acceptance of it as a usable process water. In reality, spills of sludge or phosphorus are unavoidable in the normal course of operations and the proper handling of them to retain the phosphorus values while concurrently producing cleaned phossy water for use is of paramount importance for safety and economic reasons. Spills typically result from blown tank rupture disks or inadvertent overfilling of the sumps, separation tanks, or sludge collectors. Some phosphorus is also blown out of loaded tank cars when the excess covering water is removed after loading.

The phosphorus separated from sludge is loaded to railroad cars or a suitable holding tank. The sludge layers collected from the separation tanks are treated to recover contained phosphorus as by centrifugation such as described in U.S. Pat. No. 3,113,839. The centrifugation process is a hot (for example, 60° C.) water user and the use of a phossy water source is not objectionable. The phosphorus in sludge is recovered as a liquid whereas the dirt ends up in a hot water slurry and it must be purged from the system to provide a dirt blowdown.

Conventional phossy water system designs, without provisions for recycle, utilize clean water makeup in many areas and generate about 1000 to 1500 gallons of contaminated phossy water for each ton of phosphorus produced. This includes the amounts generated as part of slag cooling, rainstorm runoff, pad washdown and the like which are relatively cold, dirty, only mildly phosphorus-contaminated streams but which nonetheless contain phosphorus and require handling as phossy water. Much larger amounts of water are also needed for process equipment cooling and scrubber makeup, but these do not end up contaminated with phosphorus and it has been found desirable to handle them separately from the phossy water and treat them differently.

Conventionally, all forms of phossy water have been brought together for combined treatment prior to recycling and/or discharge. Thus, the hot streams are cooled by dilution with the colder sources of waste water. Clarification has been effected by two different treatments. The earlier method involved conducting the phossy water to a pond and allowing the suspended solids and phosphorus to settle. A portion of the clarified water was recycled, that intended for processing and phosphorus handling operations requiring heating. That portion to be discharged was treated to oxidize contained phosphorus to a phosphate prior to its being discharged.

More recently, the phossy waters have been combined, a flocculating agent added and the mixture passed to a large conventional water or sewage treatment type clarifier. The clarified effluent is recycled to the plant, that intended for use in the processing and phosphorus handling operations requiring heating. The underflow may be discharged to a pond, burned to produce phosphoric acid or processed as by centrifugation or distillation to recover the phosphorus. The feed water and underflow may require continuous or intermittent heating so that sludge or phosphorus spills, which would freeze if cooled below the melting point, can be handled.

The conventional approaches to clarification suffer from high heat losses due to exposed water surface area. Conventional clarifiers as used in water and sewage treatment plants rely on simple sedimentation, but this leads to inconveniently large sizes because the very fine particulate solids and phosphorus globules settle so slowly. It is extremely difficult to prevent heat loss from these designs. Smaller equipment can be used when flocculating agents are added to increase sedimentation rates, but the basic problems of the equipment design are not eliminated.

An additional problem is carbon monoxide (CO) evolution from the phossy water, which becomes saturated with CO upon contacting in the condensers. When phossy water storage or clarification vessels are covered to achieve fume control and heat conservation, CO will be evolved into any gas space and create a gas explosion potential. It is thus very desirable to keep enclosed gas areas small in volume so that gas sweeping requirements are minimized and explosion venting areas are kept small.

The present approach to clarification which is more suitable to the processing of hot phossy water is the use of a stacked plate-type or lamellar-type clarifier. This design uses stacked, angled plates so that sedimentation distance is short and much clarification area can be packaged in a small volume. The designs incorporating this approach are easily insulated and can be easily covered to control fuming and heat loss. Explosion vents are likewise easily fitted.

The present invention provides a system wherein no phossy water is discharged into the environment.

The present invention further provides a system wherein phossy waters are clarified so as to permit their recycling in the plant and which results in a recovery of the major proportion of the phosphorus from the hot phossy water.

The present invention provides a system wherein process spills are safely handled and the mechanical problems of handling clarifier sludge underflow are solved.

The present invention provides a system which allows easy fume control, purging and venting to achieve industrial hygiene, safety, and pollution control objectives.

The present invention provides a system that allows an effective removal of the fine dirt from the hot phossy water while maintaining the phosphorus in and recovering it from the hot phossy water.

The present invention also provides a system wherein energy requirements are reduced to a minimum in providing processing water at necessary temperatures.

The present invention provides a system wherein the fresh water requirements for the operation of a plant are reduced to a minimum.

Pursuant to the present invention, the phossy waters are segregated into a hot, relatively phosphorus-rich stream, and a cold, usually phosphorus-lean stream, and the segregated streams clarified independently for recycling in the plant.

The hot phossy water is that which has come into contact with the phosphorus during production and handling, such as that which is excess from the furnace condenser/sump systems, that generated by phosphorus transferring from sump to tank to rail car and that generated by sludge separation operations in the tanks.

The cold stream comprises water runoff from slag cooling, operating area floor and pad cleanup and storm water runoff. One hot stream, the sludge centrifugation waste water, must necessarily be included with the cold streams because it functions as the dirt blowdown route for the sludge and hot phossy water processing systems. Excess water from the hot phossy water system, not needed for processing operations, is also discharged to the cold stream system for water volume balancing reasons.

The drawing is a schematic diagram illustrating the system of the present invention.

The furnace shown generally at 1 is of a conventional design and comprises a domed crucible and associated hoppers shown at 2 from which the burden is supplied to the furnace by gravity. Electrical power is supplied to electrodes suspended through the dome of the furnace (not shown), driving the phosphorus producing reactions.

Periodically, the furnace is tapped to remove the ferro-phosphorus and slag formed in the reduction of the ore. The ferrophosphorus flows into suitable chill molds 3. The slag flows into a slag pit, represented at 5, where water is sprayed onto the slag from pipeline 6. The water which is not vaporized forms a source of cold phossy water and eventually drains into a pit from which it is withdrawn. Further sources of cold phossy water are those resulting from flushing of the floor in the furnace building, represented at 7, and other operating unit areas, represented at 8, also collect in slag pit 5 with storm runoff 9. These cooling and washing waters are low in phosphorus content and are combined into pipeline 10 through which the water flows into a lined pond 15 and an associated lined surge pond 16 to receive the decanted water. The particulate phosphorus and solids picked up by these waters settle in the lined pond or ponds being permanently stored therein in an environmentally acceptable manner. Clarified water is withdrawn from the pond and recycled to various cold water users such as gas scrubbers 17. Some is supplied as makeup water to the hot water system through line 18 to the first condenser sump 27 which provides a source of free heat, while some is used for floor or pads washdown as at 7 and 8.

The furnace gases containing volatilized phosphorus, particulate solids, carbon monoxide and traces of other gases pass from furnace 1 to one or more electrostatic precipitators 20 where the major portion of the particulate solids is removed. The particulate solids, generally referred to as dust, are collected at the bottom of the precipitator and transferred to a hopper 21 where they are slurried with recycled hot water. The use of hot water has been found necessary to alleviate operational problems. The slurry is transferred for further processing 22 so that contained fertilizer values may be utilized.

The gases leaving the precipitators then pass to a spray condenser 25, where recycled hot water is introduced through sprays 26 to cool the dry hot gas by adiabatic evaporation to about 60° C., a temperature below the dew point but above the freezing point of phosphorus. The phosphorus condenses into globules which fall to the base of the condenser thence to sump 27 along with the water and entrained particulate solids not removed in the precipitators.

The phosphorus and dirt settle to the bottom of the sump 27 and are removed via pipeline 29 to one of several separation tanks, and the several tanks being represented schematically at 40. The decanted sump water is recirculated to the sprays 26 for gas cooling. Water enters the sump from other sources such as 28. Excess sump water is passed through a pipeline 30 to a clarifier feed tank 60.

Gases from the first spray condenser pass to a second spray condenser 45 and are cooled by water sprays 46 to below the phosphorus freezing point, typically to 20° C. The remaining phosphorus freezes into flakes, water evaporated in condenser 25 condenses and the phosphorus flakes and water fall to a sump 47 where the phosphorus collects and is periodically melted by heating and pumped via pipeline 48 to one of the several separation tanks 40. A portion of the water collected in sump 47 is recirculated to the sprays 46, after being chilled in a cooling tower 49, and the balance of the water is returned to the first condenser sump 27 via pipeline 50. The cleaned gas, largely carbon monoxide, passes through a pipeline 51 to fuel gas users.

The phosphorus and dirt collected in the sumps 27 and 47 transferred to the separation tanks 40 typically stratifies into three layers, a lower layer of liquid phosphorus 41 formed by coalescence of phosphorus globules, an intermediate layer of dispersed phosphorus globules and dirt known as sludge 42, and an upper layer of hot phossy water 43. The phosphorus layer 41 is moved by displacement techniques to a railroad tank car 44 for shipment out, or alternatively to a holding tank, not shown. The railroad car 44 is typically filled with water, returned from the location to which the phosphorus has been delivered, so this water is a source of new makeup to the entire phossy water system. The sludge layer 42 is transferred by displacement techniques to sludge collector 55 which acts as a feed tank for the centrifuge 75. The centrifuge extracts from the sludge a dirty phosphorus stream 76 which may be used for low grade phosphoric acid production or alternatively may be purified by distillation techniques in separate equipment (not shown) or alternatively in the original phosphorus production furnace 1. Waste water from the centrifuge 75 is a hot water slurry of dirt slimes and residual phosphorus globules not coalesced in the centrifuge on the first pass and is passed to a receiving tank 78.

All storage and transport tanks as in 40, 44 and 55 are fitted with means for maintaining them at process temperatures 55° C.–80° C. and all process water used in the transfer or process operations must be at similar hot temperatures so as to prevent freezing of the phosphorus. The water overflows, from the tanks 40, 44 and 55 which are at the hot temperatures, are collected in a line 57 and directed to a collection sump 56. The water thus collected is directed to clarifier feed tank 60 via pipeline 58 where it combines with the other hot process water. This tank 60 serves as the collecting point for all hot process water prior to its clarification and reuse.

In accordance with the present invention, the hot phossy water collected in tank 60 is preferably clarified by the use of an insulated lamellar-type clarifier 61. Preferably, prior to passing the hot phossy water to the clarifier, a cationic flocculating agent is mixed with the phossy water. Satisfactory flocculants include medium to high molecular weight polyacrylamides such as, for example, Hercofloc 849, Betz 1155, 1160, 1175 and Nalco 609. The flocculant is supplied from drums or bags 65a to mixing and feed tank 65 to which clean, cold water 66 is added for dilution and polymer activation. The flocculant is metered into and mixed with the phossy water in amounts of from about 2 to about 20 parts per million prior to delivery to the clarifier.

This type of clarifier consists of a closed tank of relatively small volume as compared to that of conventional water treatment clarifiers. The tank includes a vertical chamber 62 and an integral inclined upper chamber 63. A plurality of spaced-inclined baffles or plates are disposed within the inclined upper chamber. Preferably, the plates are at a 45° to 55° angle with respect to the horizontal. The liquid to be clarified enters the inclined upper chamber and is directed to flow upwardly over the plates in a slow, non-turbulent manner. Because of the relatively close spacing between the plates, the suspended particles in the liquid fall through a small vertical distance before coming in contact with a plate surface. As a layer of particles is formed on the inclined plates, the layers gradually sluff off and fall into the lower vertical chamber to form a sludge underflow.

The cleaned, hot water exits the clarifier to a tank 64 from which it is recycled to hot phossy water users such as the sludge centrifugation process via line 68, the phosphorus transferring operations via line 69 or slurrying precipitator dust as via line 70. Excess hot water is discharged back to the cold side of the system via line 71.

The sludge underflow collected in chamber 62 is discharged by gravity to the collection sump 56, preferably near the sump bottom. Material collected on the sump bottom is pumped to receiving tank 78 via line 72, with excess returning to the collection sump via an overflow line 73. Material settling in receiving tank 78 is pumped to hydrocyclones 80, preferably of about one inch internal diameter. To handle the required volume, a plurality of hydrocyclones are used although only one is shown on the flow diagram at 80. The hydrocyclones effect a particle size classification, such that those smaller than 8–15 micrometers are rejected in an overflow suspension, while those larger than 8–15 micrometers are delivered to the apex as a concentrated underflow sludge. The stream with smaller particles, the overflow 81, contains mostly fine dirt slimes with very little phosphorus and this stream is sent to the ponds in the cold side of the phossy waste processing system. This stream functions as the blowdown for the removal of the dirt from the entire hot phossy water system. The underflow stream 82, a concentrated phosphorus sludge, is enriched in phosphorus with considerable economic value and the phosphorus is recoverable by recycling through the centrifuge, which is conveniently accomplished by routing the hydrocyclone underflow stream or sludge to the sludge collector 55.

The unavoidable spills of phosphorus and sludge which occur during normal operations are directed through pipeline 57 to collection sump 56. The spills settle readily in the collection sump and will be processed through the receiving tank 78, hydrocyclones 80, sludge collector 55 and centrifuge 75. Alternatively, the spills may be conducted directly to receiving tank 78. In conventional practices, minor spills may be added to the combined cold and hot phossy water and discharged to a pond. Major spills may be passed to a suitable tank, the phosphorus recovered and the sludge added and processed with other plant sludge.

In the discussion, reference has been made to sumps. Sumps are generally underground tanks in conventional plant designs. In the rebuilding of plants and in the construction of new plants, the sumps may be above ground structures, if desired. It is obvious that for the purposes of the present invention such aboveground tanks should be provided with suitable insulation so as to prevent excessive heat loss.

So as to retain the maximum amount of heat in the hot phossy water, the clarifier and aboveground handling tanks and pipelines are provided with suitable insulation. Some heat is inevitably lost, but the flows are such that adequate heat is brought in and moved through by the mass of the water so that there is no appreciable cooling. If situations arise whereby heat is required, this can be accomplished by means of a steam lance inserted into the recycle tank 64 or heaters placed in lines to certain areas requiring hotter water.

The process design described herein has several important features not obvious on the surface, but which have been found beneficial or necessary to achieve successful operation. One feature involves separations made in sump 56 wherein heavy, phosphorus-rich material is preferentially handled through the hydrocyclones and thence to a sludge collector 55. This approach removes most large process spills from the clarifier feedwater so that its composition does not vary as much and there is much less likelihood of the clarifier being filled with phosphorus-rich sludge which would carry over into the tanks and pipelines, causing hazardous conditions.

Another unobvious feature is that all potential traditional routes for phosphorus or sludge spills from the plant have been removed and replaced with only one, the hydrocyclone overflow, which can be tightly monitored to prevent losses which would subtract from production efficiency.

Yet another unobvious feature is the concentration achieved by processing clarifier sludge underflow first through hydrocyclones prior to storage of the phosphorus-rich sludge in the sludge collector tank. This preprocessing of the clarifier sludge underflow prior to storing it in tankage removes contaminating dirt so that much more phosphorus may be stored per unit volume, thus more effectively utilizing tank storage capacity.

Yet another unobvious feature is the use of the receiving tank 78 in addition to collection sump 56. The receiving tank 78 functions as a coarse clarifier providing in essence one stage of separation between the most likely source of heavily dirt- and phosphorus-laden water, the centrifuge wastewater stream 77, and the water which will be fed to the clarifier, stream 58. This design approach minimizes loading to the clarifier, thus saving on flocculant usage and assuring production of cleaner water.

Yet another unobvious feature is that a plant's complete needs for hot process water can be supplied without heating expense, because cold water can be heated by the hot gases in the first adiabatic condenser and then used in areas needing hot water, after clarifying to remove suspended finely-divided phosphorus globules and dirt.

Yet another feature is the easy control over plant water balance afforded by the design. Discharges from the hot system are only those used for carrying dirt to other processes (via line 70), necessary for dirt purging (via line 81) and any excess not needed in other locations (via line 71). The blow-down from the total system to scrubbers or other water treatment systems (shown as 17) occurs through one line and can be easily adjusted to balance total system makeup so that surge pond level can be controlled, neither too full so that there is no surge capacity, nor too empty such that there would be a water shortage.

An additional advantage of the system herein disclosed is the recovery of a large proportion of phosphorus contained in the hot processing water. On an average, the hot phossy water will contain about 300 ppm of phosphorus conventionally discharged to the pond requiring some treatment before discharging the water to the environment. By segregating the hot phossy water and the use of a lamellar-type clarifier in the treatment of the hot phossy water, at least about 99% of the phosphorus contained in the hot phossy water is retained in the clarifier sludge underflow. Subsequent treatment of the sludge thus results in the recovery of appreciable phosphorus conventionally lost to the pond.

The following examples are illustrative of the method of operation and the benefits attainable by use of the herein described process design, but are presented for illustration only and are not to be considered as limitations.

EXAMPLE 1

A Pilot Inclined-Plate Clarifier

Hot phossy water was supplied to a Parkson Corporation Lamella® Gravity Settler-Thickener (45°-LGST) provided with plates inclined at a 45° angle to the horizontal and having an effective baffle area of 87.5 square feet (8.13 sq. m.). The phossy water entered the settler at a rate of 40 gpm (151.4 l/min.), equivalent to 0.46 gpm/sq. ft. (18.7 l/min./sq. m.). The phossy water contained 306 ppm of phosphorus (equivalent to about 6.1 lbs./hr. or 2.67 kgs./hr.) and 3,303 ppm of suspended particulate solids to which had been added 2 ppm of Hercofloc 849. After an equilibrium had been established, the effluent [about 39.7 gpm (150.28 l/min.)] contained 0.9 ppm phosphorus (equivalent to about 0.018 lbs./hr. or 8.1 gms./hr.) and 184 ppm suspended particulate solids. The sludge underflow removed by the clarifier contained about 6.1 pounds per hour (2.66 kgs./hr.) of phosphorus and about 62.4 pounds per hour (28.3 kgs./hr.) particulate solids equivalent to about 145 pounds (64 kgs.) of phosphorus and about 1,500 pounds (680 kgs.) particulate solids per day. In normal operation, the phosphorus would be lost to the pond.

EXAMPLE 2

Energy Savings

In addition to the recovery of the phosphorus, an appreciable saving in heat is attained by segregating the hot phossy water for recirculation. Let it be assumed that hot phossy water needs for a full-scale plant were 170 gpm and that hot water generated is combined with cold phossy water and the mixture is discharged to a pond. Assume also, that the temperature of the mixture in the pond falls to 50° F. (10° C.). Upon withdrawal of the water for processing, the temperature must be raised to about 140° F. (60° C.) requiring 90 BTU/lb. of water. Hence, the energy required to heat 170 gpm for one day is $184 \times 10^6$ BTU. The typical cost of heating water with steam is about $7.0 per million BTU. Thus, the cost of the energy would be about $1300 per day. By segregating the process-heated hot phossy water and insulating the pipelines, settler and other associated equipment, the major portion of this energy requirement is eliminated.

EXAMPLE 3

Full-Scale Plant Efficiency

The process as herein described was run on a full plant scale. The clarifier cleaned up for reuse an average of 200 gpm of hot phossy water feed, producing a hot product water suitable for process use without requiring additional heat. The system elements functioned to allow only about 50,300 pounds (22,864 kgs.) of elemental phosphorus to escape, while 522,800 pounds (237,640 kgs.) of dirt was separated and rejected by the hydrocyclones. During this same period, about 5,083,000 pounds (2,310,450 kgs.) of phosphorus was recovered from the sludges handled for a total system phosphorus efficiency of 99.0%.

A survey of other like periods with similar levels of sludge production prior to the trial of the process herein described showed that typical elemental phosphorus losses would have been about 495,600 pounds (225,272 kgs.), so that the process herein described recovered 445,300 pounds (202,410 kgs.) phosphorus which would otherwise have been lost from process. This amount is, for the period considered, a 1.75% increase in phosphorus production efficiency over that which would otherwise have been attained.

What is claimed is:

1. In the electric furnace production of elemental phosphorus the steps comprising segregating cold phossy water used for cooling and washing purposes from hot phossy water used in condensing and handling liquid phosphorus, clarifying the segregated cold phossy water, recycling the clarified cold water for cooling and washing purposes, passing hot furnace gases containing phosphorus vapors and entrained particulate solids through a gas-solids separator to remove the major proportion of the solids, passing the hot furnace gases from the separator through a hot water spray in a first condenser to reduce the gas temperature below the dew point of the phosphorus but above the freezing point of the phosphorus to condense phosphorus vapors into liquid phosphorus globules, allowing the hot water, liquid phosphorus globules and entrained particulate solids to pass into a first sump and form a suspension of liquid phosphorus globules and particulate solids in hot phossy water, allowing the suspension to stratify into a hot phossy water layer, a liquid phosphorus layer and an intermediate sludge layer in the first sump, recycling the hot phossy water to the spray in the first condenser, passing the gas containing residual phosphorus vapors, residual entrained particulate solids and water vapors from the first condenser through a cold water spray in a second condenser to cool the gas to a temperature below the freezing point of phosphorus to freeze the residual phosphorus vapors and condense the water vapors, allowing the frozen phosphorus particles, particulate solids and water to pass into a second sump and form a suspension of phosphorus particles and particulate solids in water, allowing the suspension to stratify into a phossy water layer and a layer of phosphorus particles, particulate solids and water, cooling a portion of the phossy water layer in the second sump and passing the cooled water to the spray in the second condenser, passing the remainder of the water layer in the second sump to the first sump to at least partially replace water vaporized in the first condenser, melting the phosphorus particles in the second sump, passing the melted phosphorus, associated water and particulate solids in the second sump and the liquid phosphorus and sludge in the first sump into a separation tank, allowing the mixture in the separation tank to stratify into a liquid phosphorus layer, a hot phossy water layer and a sludge layer, transferring the phosphorus to a railroad car to displace the water therein, passing excess hot phossy water from the first sump and displaced hot phossy water from the separation tank and the railroad car into a lamellar settler wherein phosphorus and suspended solids separate from the hot phossy water as a sludge underflow to form clarified hot water, recycling the clarified hot water for condensing and handling liquid phosphorus and recovering phosphorus from the lamellar settler sludge underflow.

2. The steps in the production of elemental phosphorus according to claim 1 that include passing the sludge underflow from the lamellar settler and the hot phossy water from the separation tank to a collection sump, allowing solids in the combined sludge underflow and hot phossy water to settle, passing excess water from the collection sump to the lamellar settler, passing the settled matter in the collection sump through hydrocyclones to form a concentrated underflow sludge and a fine dust slime overflow suspension, discharging the fine dust slime overflow suspension to a pond, recovering phosphorus from the concentrated underflow sludge by passing the concentrated underflow sludge through a centrifuge and recycling the waste water effluent from the centrifuge through the hydrocyclones.

3. The steps in the production of elemental phosphorus according to claim 2 that include passing the sludge in the separation tank to a sludge collector, passing the concentrated underflow sludge from the hydrocyclones to the sludge collector and passing the combined sludges through the centrifuge.

4. The steps in the production of elemental phosphorus according to claim 3 that include passing displaced water from the separation tank, displaced water from the railroad car and displaced water from the sludge collector to the collection sump and excess water in the collection sump is passed to the lamellar settler.

5. The steps in the production of elemental phosphorus according to claim 4 that include passing clarified hot water from the lamellar settler to the separation tank to displace the phosphorus or phosphorus sludge in the separation tank.

6. The steps in the production of elemental phosphorus according to claim 1 that include passing the settled matter in the collection sump to a receiving tank, allowing the solids in the receiving tank to settle, passing the excess water in the receiving tank to the collection sump, passing the settled material in the receiving tank through hydrocyclones to form a concentrated underflow sludge and a fine dust slime overflow suspension, discharging the fine dust slime overflow suspension to a pond, passing the concentrated underflow sludge to a sludge collector, passing displaced water in the sludge collector to the collection sump, passing the sludge from the sludge collector through a centrifuge to recover phosphorus from the sludge and passing the waste water effluent from the centrifuge to the receiving tank.

7. In the electric furnace production of elemental phosphorus wherein cold phossy water is formed from water used for cooling and washing purposes and hot phossy water is formed from water used in condensing and handling liquid phosphorus, the improvement which comprises maintaining the cold phossy water segregated from the hot phossy water, mixing a flocculant with the hot phossy water, passing the hot phossy water mixed with the flocculant into a stacked plate-type clarifier wherein phosphorus and suspended solids are separated from the hot phossy water as a sludge underflow to form clarified hot water, discharging hot water purge streams including excess clarified hot water into the cold phossy water, recycling the clarified hot water for condensing and handling liquid phosphorus, recovering phosphorus from the phosphorus and suspended solids separated from the hot phossy water, discharging the cold phossy water into a lined pond, allowing phosphorus and suspended solids in the discharged cold phossy water to settle in the pond to form clarified cold water and recycling the clarified cold water for cooling and washing purposes.

8. The improvement in the production of elemental phosphorus according to claim 7 wherein the flocculant is a cationic flocculating agent.

9. The improvement in the production of elemental phosphorus according to claim 7 wherein the hot phossy water contains phosphorus or phosphorus sludge spills.

10. The improvement in the production of elemental phosphorus according to claim 9 that includes passing the hot phossy water containing phosphorus or phosphorus sludge spills to a collection sump, allowing heavier material to settle in the sump, passing the water layer in the sump to the stacked plate-type clarifier, transferring the heavier material to a sludge collector, allowing the heavier material to settle in the sludge collector, passing the water layer in the sludge collector to the collection sump and recovering phosphorus from the settled material in the sludge collector.

11. The improvement in the production of elemental phosphorus according to claim 10 that includes adding the stacked plate-type clarifier underflow sludge to the hot phossy water in the collection sump.

12. The improvement in the production of elemental phosphorus according to claim 11 that includes passing the heavier material in the collection sump through hydrocyclones to form a concentrated underflow sludge and a fine dust slime overflow suspension, discharging the fine dust slime overflow suspension to the pond, transferring the concentrated underflow sludge to a sludge collector, recovering phosphorus from the settled sludge in the sludge collector by passing the settled sludge through a centrifuge and recycling the waste water effluent of the centrifuge through the hydrocyclones.

13. The improvement in the production of elemental phosphorus according to claim 10 that includes passing the heavier material in the collection sump to a receiving tank, allowing the heavier material in the receiving tank to settle, passing the excess water in the receiving tank to the collection sump, passing the settled heavier material in the receiving tank through hydrocyclones to form a concentrated underflow sludge and a fine dust slime overflow suspension, discharing the fine dust slime overflow suspension to the pond, passing the concentrated underflow sludge to a sludge collector, passing excess water in the sludge collector to the collection sump, recovering phosphorus from the sludge in the sludge collector by passing the sludge through a centrifuge and recycling the waste water effluent from the centrifuge to the receiving tank.

* * * * *